(12) United States Patent
Busser (10) Patent No.: US 6,990,611 B2
(45) Date of Patent: Jan. 24, 2006

(54) RECOVERING DATA FROM ARRAYS OF STORAGE DEVICES AFTER CERTAIN FAILURES

(75) Inventor: Richard W. Busser, Longmont, CO (US)

(73) Assignee: Dot Hill Systems Corp., Carlsbad, CA (US)

( * ) Notice: Subject to any disclaimer, the term of this patent is extended or adjusted under 35 U.S.C. 154(b) by 667 days.

(21) Appl. No.: 09/751,090

(22) Filed: Dec. 29, 2000

(65) Prior Publication Data

US 2002/0095616 A1 Jul. 18, 2002

(51) Int. Cl.
*G06F 11/00* (2006.01)

(52) U.S. Cl. ............................................. 714/42; 6/7
(58) Field of Classification Search ............... 714/6–8, 714/42
See application file for complete search history.

(56) References Cited

U.S. PATENT DOCUMENTS

| | | | | |
|---|---|---|---|---|
| 5,479,653 A | * | 12/1995 | Jones | 714/5 |
| 5,968,182 A | * | 10/1999 | Chen et al. | 714/5 |
| 5,974,544 A | * | 10/1999 | Jeffries et al. | 713/1 |
| 6,243,827 B1 | * | 6/2001 | Renner, Jr. | 714/6 |
| 6,353,895 B1 | * | 3/2002 | Stephenson | 714/5 |
| 6,408,406 B1 | * | 6/2002 | Parris | 714/41 |
| 6,467,023 B1 | * | 10/2002 | DeKoning et al. | 711/114 |
| 6,530,035 B1 | * | 3/2003 | Bridge | 714/6 |
| 6,557,123 B1 | * | 4/2003 | Wiencko et al. | 714/701 |
| 2002/0016942 A1 | * | 2/2002 | MacLaren et al. | 714/718 |
| 2003/0120869 A1 | * | 6/2003 | Lee et al. | 711/135 |

\* cited by examiner

*Primary Examiner*—Robert Beausoliel
*Assistant Examiner*—Michael Maskulinski
(74) *Attorney, Agent, or Firm*—Sheridan Ross P.C.

(57) ABSTRACT

A method is disclosed for recovering data from a RAID system after a transient failure. After a transient failure, the cause of the failure is corrected and a user initiates a trust array command. The RAID controller receives the trust array command and performs several modifications to the disk metadata. First, the partition age metadata field is synchronized. Second, the primary dead partition map metadata field is cleared. Third, the partition status metadata field is set to initialized. Following the metadata modifications, the RAID controller verifies that it can access all of the drives in the array. If all drives are accessible, the array is on-line and fault tolerant without the need for re-constructing a drive within the array, or re-creating the array. If one drive remains inaccessible, data is available from the array, and the array is in a critical state. If two or more drives remain inaccessible, the array remains off-line and a partial recovery may be attempted. The trust array command may, in certain instances, be initiated automatically by the RAID system without any user involvement.

23 Claims, 6 Drawing Sheets

RECOVERING DATA FROM ARRAYS OF STORAGE DEVICES AFTER CERTAIN FAILURES

FIELD OF THE INVENTION

The present invention relates to computer system data storage, and more particularly, to methods for re-using arrays or bringing arrays back on-line which have suffered from transient failures.

BACKGROUND OF THE INVENTION

A typical data processing system generally involves one or more storage units which are connected to a host computer either directly or through a control unit and a channel. The function of the storage units is to store data and other information (e.g., program code) which the host computer uses in performing particular data processing tasks.

Various types of storage units are used in current data processing systems. A typical system may include one or more large capacity tape units and/or disk drives connected to the system through respective control units for storing data. However, a problem exists if one of the storage units fails such that information contained in that unit is no longer available to the system. Generally, such a failure will shut down the entire computer system.

This problem has been overcome to a large extent by the use of Redundant Arrays of Inexpensive Disks (RAID) systems. RAID systems are widely known, and several different levels of RAID architectures exist, including RAID 1 through RAID 5, which are also widely known. A key feature of a RAID system is redundancy. The array contains a number of drives, and data is written to the drives in such a way that if one drive fails, the data that was written to the array can still be read. How this redundancy is accomplished depends upon the level of RAID architecture used, and is well known in the art. By way of example, a common architecture that is used is RAID 5. In a RAID 5 system, parity information is calculated from the data that is to be stored. This parity information is written along with the data to the drives in the array. If the drive on which the parity is written fails, the data is still available from the other drives. If a drive on which a portion of the data is written fails, the controller can read the remaining data and the parity information to determine what the missing data is, and recreate or reconstruct the missing data, thus making the data available.

Figure 1:
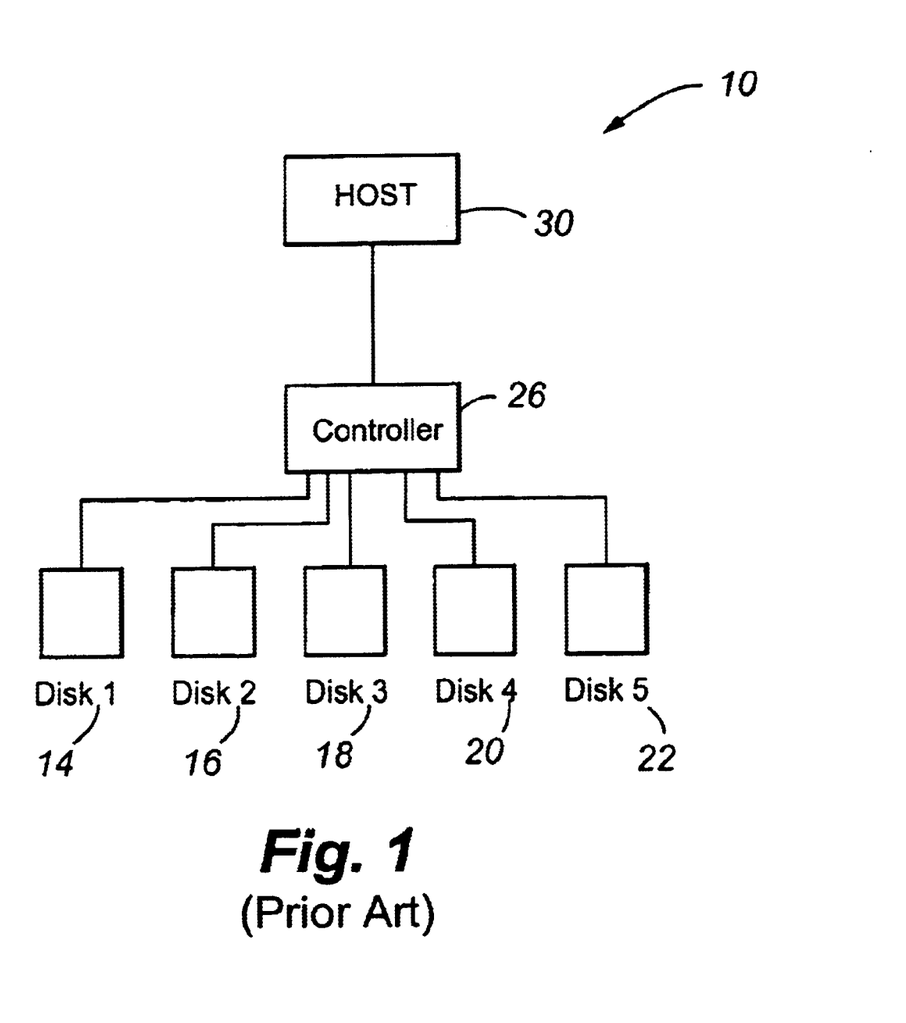
FIG. 1 is a block diagram representation of a RAID system.

As shown in FIG. 1, a typical RAID system 10 contains a number of separate disk drives 14, 16, 18, 20, 22, which are connected to at least one controller unit 26. It should be understood that the number of drives shown in FIG. 1 are for the purpose of discussion only, and that a RAID system may contain more or fewer disk drives than shown in FIG. 1. The controller unit 26 is connected to a host computer 30, which communicates with the controller unit 26 as if it were communicating to a single drive or other storage unit. Thus, the RAID looks like a single drive to the host computer 30. The controller unit 26 receives read and write commands, and performs the appropriate functions to read and write data to the disk drives 14, 16, 18, 20, 22, depending upon the level of RAID that is implemented in that system.

The disk drives 14, 16, 18, 20, 22 that are in a RAID are generally kept in an enclosure (not shown), which provides power and connection to the drives. The connection between the controller unit 26 and the disk drives 14, 16, 18, 20, 22 is generally a SCSI connection, although other types of connections may be used as well.

The drives 14, 16, 18, 20, 22 within an array each contain metadata. This metadata includes information regarding the RAID system, and also has information regarding the active drives in the array. This metadata is used by the controller to determine which drives are accessible, and therefore the state of the array. If one or more drives in the array have suffered a failure, the metadata contained on the remaining drives is updated to mark these failed drives as bad. If one drive is marked as bad in the metadata, the controller sets the condition of the array to critical, meaning that data can still be read and written, but that if any other drives fail the array will go off-line. To correct this problem, the failed drive must be replaced, and the array rebuilt. When the array is rebuilt, the replacement drive remains marked as bad in the metadata and is only accessed if the requested data has already been rebuilt. The replacement drive remains marked as bad in the metadata and is only accessed if the requested data has already been built. The array must then be reconstructed by writing the data to the replacement drive that was present on the failed drive. If the failed drive contained data, this data is reconstructed using the remaining data and the parity information. If the failed drive contained parity information, this parity information is reconstructed using the data written on the other drives. Once the data and/or parity information for the replaced drive is reconstructed, the array again becomes fault tolerant.

If two or more drives are marked as bad, the controller marks the array as being off-line. This means that data cannot be read from or written to the array. In such a case, the array must be repaired and re-created. When an array is re-created, each drive receives new metadata which shows all drives as being available. The array must then be initialized and the data must be restored to the array from a backup copy, which is typically a time consuming process. This means that data from the RAID system will not be available to the host computer until the restoration from backup is complete. Additionally, any data written to the RAID system subsequent to the latest backup of the system prior to the failure will be lost. Thus, it would be advantageous to have a system which may allow a faster recovery, or which may allow a partial recovery, of data within the system.

Occasionally, a failure may occur which is not a physical failure of the individual drives within the array, but a failure of a component or subsystem which connects the individual drives to the system. Such a failure can be defined as a transient failure. A transient failure may occur in several situations, including an enclosure problem, a controller problem, a SCSI interface problem, or a cabling problem, to name a few. The common element in these failures is that the disk drive itself has not failed or malfunctioned, but is marked as bad in the metadata of the remaining drives. Because the metadata of the remaining drives show a bad drive, the array may be marked as critical, or as off-line, even though the drives marked as bad may in fact not have failed. In such a case, a user must take the same action as described above where there was an actual failure of a disk drive. This means reconstructing data, or restoring data from a backup copy. As described above, this can be a time consuming process resulting in inability to access the array for a period of time, and the possibility of loss of recently written data not contained in the backup copy. Thus, it would be advantageous to have a system and method for restoring an array after such a transient failure which does not require data reconstruction or restoration.

As mentioned above, transient failures may be caused by several events. One event that may cause a transient failure is an enclosure or housing problem. As mentioned above, the drives within the RAID system are typically contained in an enclosure. The enclosure contains a backplane which provides connections to the drives and provides power to the drives. A transient failure may result from a backplane problem within the enclosure. In such a case, the backplane may be damaged or have some type of short, resulting in one or more drives being marked as bad. Additionally, the enclosure may lose power during a write operation. In this case, some drives have new data while some may not have written the new data yet. If this happens, the drive(s) which have not written the new data may be marked as bad drives in the metadata.

Another event causing a transient failure may arise when there is a cabling problem. This can occur if the cables used to connect the system have a failure. For example, a cable may be inadvertently disconnected, damaged in such a way that information may no longer pass through the cable, or some type of short between conductors of the cable can occur. The drives affected by this cabling problem may be marked as bad drives in the metadata.

Another transient failure may occur if the controller unit has a failure. If such a failure occurs, one or more disk drives may be marked as bad. When the controller is repaired the drives may still be marked as bad in the metadata. This may create the necessity of recovering the array using the time consuming techniques described above.

Another transient failure may occur in the SCSI interface located in the enclosure. For example, the termination point of the SCSI connectors may have a failure, or the SCSI chip may fail. Again, in such an event, one or more drives may be marked as bad in the metadata. This may create the necessity of recovering the array as described above once the SCSI problem is corrected.

Accordingly, it would be advantageous to be able to recover a RAID system in the event of a transient failure without the need to recreate the array and restore the data to the array from backup. It would also be advantageous to be able to partially recover data from an array in which more than one drive has failed. It would also be advantageous to be able to recover from a single bad drive transient failure without having to reconstruct the data on that drive.

SUMMARY OF THE INVENTION

In accordance with the present invention, method and apparatus for recovering data from arrays that may suffer from transient failures are provided.

The method includes the steps of first using an array of storage devices to conduct input/output operations under control of at least a first controller. During the use of the array, metadata is provided to each of the storage devices in the array. When a failure of the array occurs in which two or more of the storage devices are marked as bad, it is determined whether the failure was a transient failure. In the event of a transient failure, there may not be any physical failure of the storage devices themselves, but two or more of the storage devices are marked as bad in the metadata based on the transient failure. The use of the array of storage devices is then resumed while substantially avoiding a reconstruction or restoration of data and/or parity stored on the two or more storage devices due to the failure.

The failure which causes the two or more drives to be marked as bad may be related to: an array enclosure, a back plane, a cable, an interface, a controller, and software used in controlling operations of the controller. Other sources of failures may also exist, these failures having in common the fact that there is not a physical failure of the storage device, but a failure of other components resulting in the metadata being changed such that the drives are marked as bad.

A determination is made related to the operation of the storage devices within the array of storage devices, including the two or more storage devices that were marked as bad. Once the determination is made that all of the devices are operable, the metadata contained on all of the storage devices within the array is synchronized. In one embodiment, the determination is made by a user. Alternatively or additionally, the determination might be made automatically and independently of the user.

After the determination has been made, a command is generated at the host and transmitted to the controller. The command instructs the controller to synchronize the metadata. In one embodiment, this command is initiated manually by a user. This command could be generated automatically by the host computer.

The apparatus includes an array of storage devices relative to which read and write data transfers are conducted, a controller communicating with the array of storage devices for conducting read/write operations, and a host communicating with the controller that makes requests related to data to be stored and data to be obtained from the array of storage devices. After a failure which results in two or more drives being marked as bad in the metadata, the host is used to generate a trust array command. The trust array command updates the metadata on each of the storage devices of the array when the fault is determined to involve a transient failure and after use of the array was discontinued due to the fault. In one embodiment the trust array command is generated in response to input from a user of the system. The trust array command is generated independently of any reconstruction or restoration of the array of storage devices due to the fault. In one embodiment, the host controls discontinuing the use of the array of storage devices based on the failure, and subsequently the host receives an input from a user of the system that is used in generating the trust array command.

Based on the foregoing summary, a number of advantages of the present invention are noted. A method for restoring an array is provided that improves previous methods of restoration following a transient failure by allowing the array to be reconstructed without the need to restore the array from parity information or from backup. This decreases the amount of time required to make the array available to the host computer again. This also makes recently saved data available, which may not be available if the array was restored from backup. This may also reduce the amount of time required for a user to restore the array. Additionally, some data may be made available from arrays in which there are two or more drives that are not operational.

Other features and advantages will be apparent from the following discussion, particularly when taken together with the accompanying drawings.

DETAILED DESCRIPTION

Figure 2:
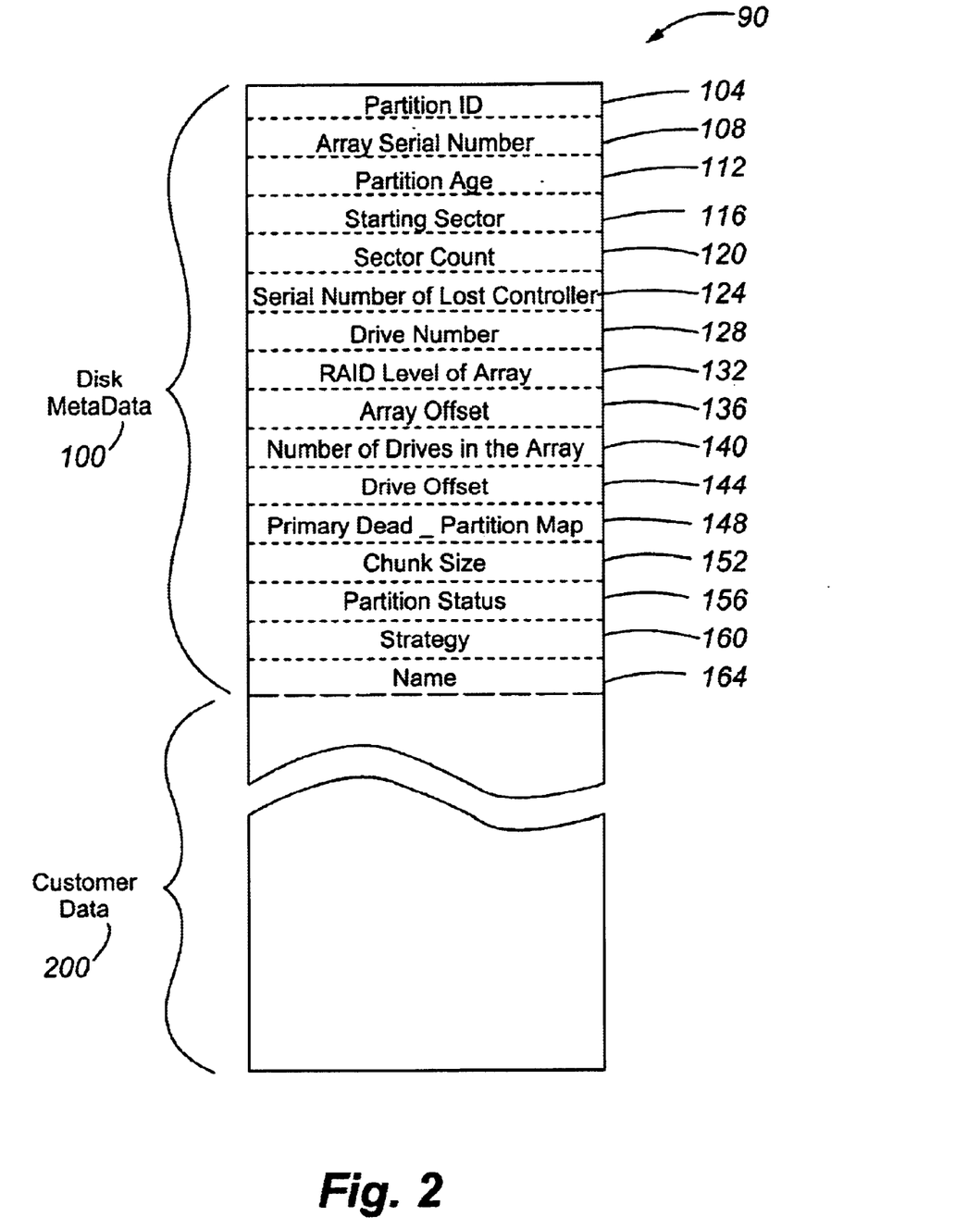
FIG. 2 is a block diagram representation showing the arrangement of disk metadata and customer data on a disk drive within the RAID system.

Referring now to FIGS. 1 and 2, the present invention utilizes the on-disk metadata to assist in recovering a RAID system 10. Each disk 14, 16, 18, 20, 22 in the RAID system 10 contains stored data 90. FIG. 2 shows a representation of one organization of this stored data. Generally, the data is divided into two categories, disk metadata 100, and customer data 200. The disk metadata 100, as will be described in detail below, contains data that the controller 26 uses to assist in the operation and management of the RAID system 10. The customer data 200 is data stored by the RAID system 10 which was sent by the host computer 30. As will be understood, this customer data 200 may include a variety of information from the host computer 30, such as software programs, personal data, or financial data, to name a few.

The disk metadata 100, as mentioned above, contains data which the controller 26 uses to assist RAID operation and management. The disk metadata 100 includes data fields which are read by the controller 26 and periodically updated by the controller 26. Several of these data fields are shown in FIG. 2, and will now be briefly described. The partition ID 104 is the offset of the partition on the disk, and is a separate logical block address (LBA) number where the offset of that particular disk begins. The array serial number 108 is a unique serial number for the array. In one embodiment, the array serial number 108 is a 128 bit number which is generated using a time stamp and a controller serial number.

The partition age 112, is a 32 bit number which is incremented during a configuration event, as will be described in more detail below. The starting sector 116 is the number of the LBA where customer data begins on the disk drive. The sector count 120 is the count of the LBAs that are reserved for customer data. The serial number 124 is the serial number of the last controller who owned the array. The drive number 128 is the SCSI ID of the physical drive that a particular partition is from.

The RAID level 132 is the level that corresponds to the particular RAID architecture that is in use on a particular array. The array offset 136 is the offset of the array in a global variable structure. The number of drives 140 is the total number of disk drive units that are used in a particular array. The drive offset 144 is the offset of a particular drive in an array (e.g. $2^{nd}$ or $3^{rd}$, etc). The primary dead partition map 148 is a bit map of the dead drives in the array, as will be described in detail below. The chunk size 152 is the number of LBAs that are in one chunk of customer data. The partition status 156 contains information about whether the array has been fully initialized, as will be described in detail below. The strategy 160 is a function pointer which is used to write data to the disk. The name 164 is a character string which is associated with the array.

As mentioned above, certain configuration events can occur that lead to updating or changing the disk metadata 100. Configuration events may include, for example, a drive failure during operation of the RAID system 10, array creation, array reconstruction, array verification, and array name change, to name a few. Following a configuration event, the array controller 26 reads the disk metadata 100 and determines the status of the RAID system 10. When a configuration event occurs, several fields of the disk metadata 100 are changed. First, the partition age 112 is incremented by the controller 26. If the controller 26 determines that any drive is not operational, the partition age 112 for that drive is not updated. Next, the controller 26 modifies the primary dead partition map 148 to reflect any dead drives in the array. Once the array is initialized, the partition status 156 is updated to contain information on whether the array has been fully initialized.

As mentioned above, certain situations may result in transient failures, in which one or more disk drives may be marked as bad in the disk metadata 100. In such a situation, any perceived bad drive will not have the partition age 112 field in its disk metadata 100 incremented. This drive will then be marked as bad in the primary dead partition map 148 field of the disk metadata 100 of the remaining drives in the array. Depending on the number of perceived bad drives, or a combination of actual bad drives and perceived bad drives, the array may not be fully initialized, and thus the partition status 156 field of the disk metadata 100 of the remaining drives will show the array as not fully initialized. Such a situation results in an array remaining off-line after the transient failure.

Figure 3:
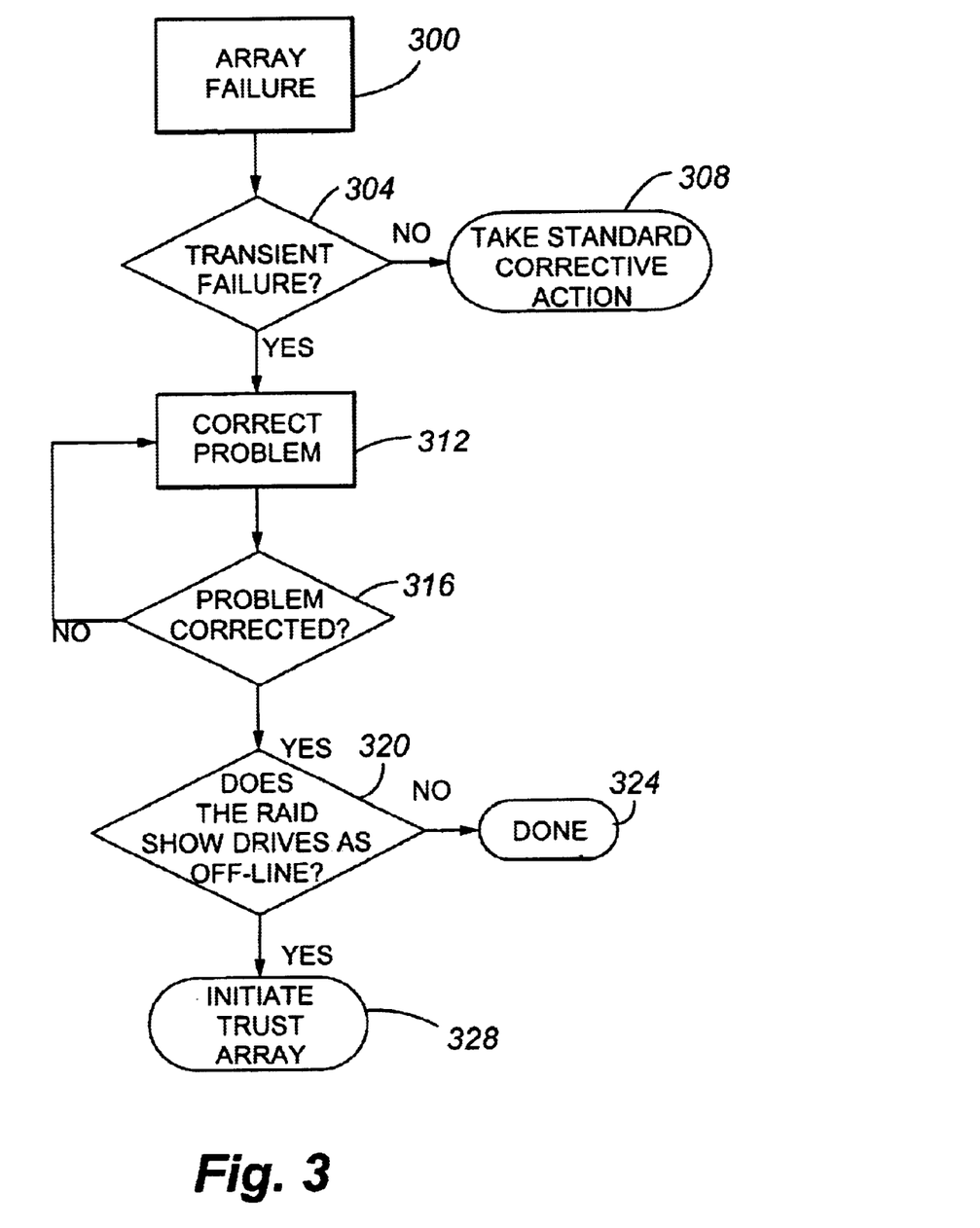
FIG. 3 is a flow chart showing user actions related to recovering a RAID system from a failure.

Referring now to FIG. 3, a flow chart is shown which represents the actions a user would take in the event of an array failure. First, as shown in block 300, there is an array failure. This failure may arise from any number of events, as discussed above. This failure may be of a single disk drive in the array, thus the array may be operating in a critical condition. Also, a failure may occur on an array which uses one or more spare disk drives. After the failure of a disk drive, a spare may have been engaged after appropriate reconstruction of data onto the spare drive. Thus, after such a failure the array may still be operational and fully redundant after the spare drive is engaged.

After a user is aware of this failure, the nature of the failure is determined. As shown in block 304, the user determines whether the failure was a transient failure, as discussed above. If the failure is not a transient failure, the user takes appropriate corrective action to correct the failure, as shown in block 308. This corrective action may include replacement of one or more drives, repair or reconstruction of one or more drives, or any other appropriate action. If the user determines that the failure was a transient failure, the user corrects the cause of this transient failure, as shown in block 312. This correction may involve the correction of a cabling problem, repair or replacement of one or more enclosure components, or other appropriate corrective actions. Additionally, in certain cases, no physical correction of a problem is required. For example, the transient failure may have been a software problem which is corrected by restarting the system, or a power interruption. After this corrective action, the user verifies that the transient failure problem is corrected, as shown in block 316. If the transient failure has not been corrected, further corrective action is required.

Once the transient failure problem has been corrected, the user determines whether any drives are shown as being off-line by the array system following the correction and any appropriate restart or reboot, as shown in block 320. If drives are shown as being off-line, this means that one or more drives have been marked as bad drives in the disk metadata. If no drives are off-line, the array is fully operational and no more action is required, as shown in block 324. However, if one or more drives are off-line, the user may initiate a trust array command, as shown in block 328. The trust array command, as will be described in detail below, will attempt to recover any drives which have been marked as bad drives in the disk metadata. Thus, these drives may be made a portion of the array again without further action, such as is taken when a non-transient fault or failure exists including actions constituting restoration of the array from a backup copy, or reconstructing data onto a new disk drive in the event that a single drive was marked as bad. In such a case, the time and effort of an array restoration or reconstruction are avoided, thus saving expense and increasing the availability of the array.

Additionally, as mentioned above, if the array includes spare drives, the user may initiate the trust array command when the array is still operational. In this embodiment, the user would perform the same steps as described above. If the failure that caused the drive to be marked as bad and initiated the spare drive was a transient failure, the drive would be available again as either the original drive, or as a spare drive. Thus, the spare drive will be restored to the array without replacing the drive or recreating the array to include a replaced spare drive. Again, this can save time and effort required to restore a spare drive to an array, thus increasing the availability of the array.

Figure 4:
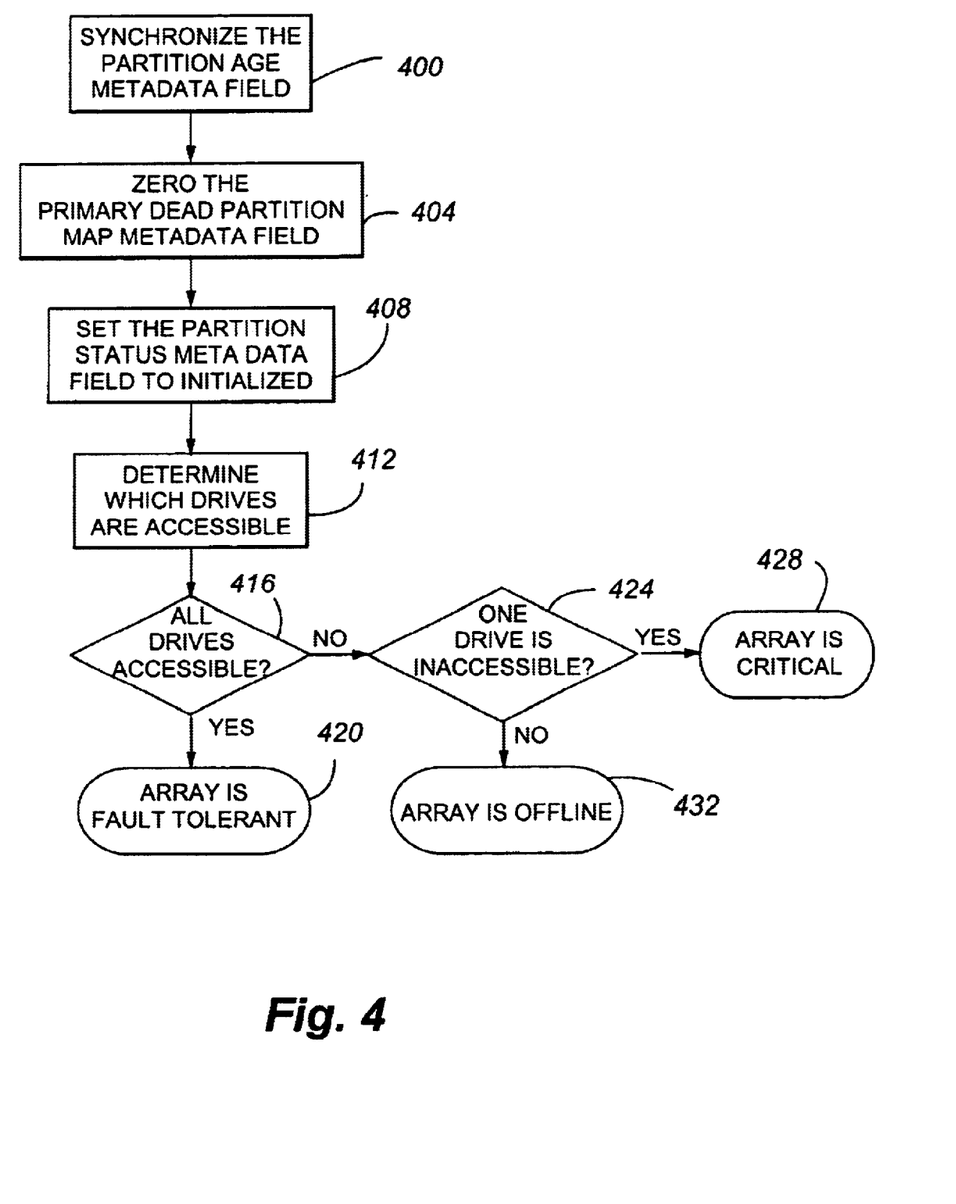
FIG. 4 is a flow chart showing the steps taken upon initiation of the trust array command.

Referring now to FIG. 4, the actions taken by the controller after the issuance of a trust array command will be described in detail. First, as shown in block 400, the partition age metadata field is synchronized on all of the disk drives in the array. This synchronization corrects any age discrepancies between the drives in the array that may have resulted from the transient failure. Next, as shown in block 404, the primary dead partition map is written as all zeros in the disk metadata. This serves to remove any dead drives from this metadata field and allows the array to recognize all of the drives as valid drives. Next, as shown in block 408, the partition status metadata field is set to initialized. This marks the array as being initialized, and thus allows data to be read from and written to the array.

Once the metadata fields have been modified, the controller determines which drives are accessible, as shown in block 412. If the controller can access all drives in the array as shown in block 416, the array is on-line and is fault tolerant, as shown in block 420. If all drives are not accessible, the controller determines whether only one drive remains inaccessible, as shown in step 424. If one drive is inaccessible, the array is on-line, however it is in a critical condition, as shown in block 428. If more than one drive remains inaccessible, the array remains off-line and further corrective action must be taken to repair the array, as shown in block 432.

Figure 5:
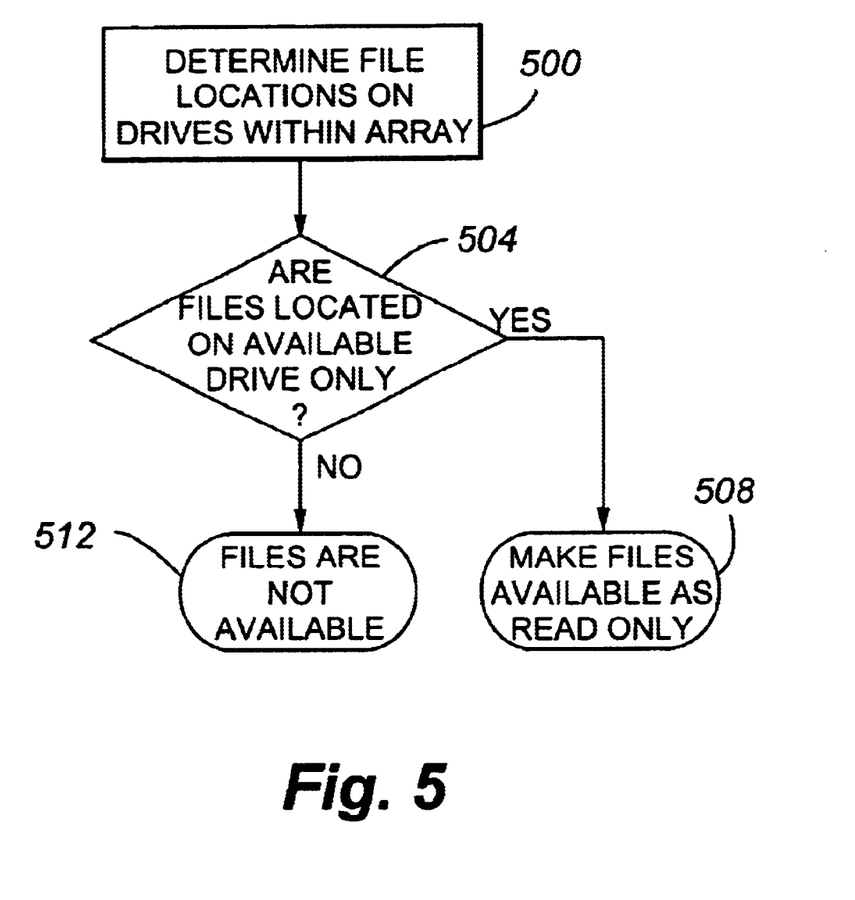
FIG. 5 is a flow chart showing steps for partially recovering data from an array system having two or more failed drives.

In one embodiment, shown in detail in FIG. 5, the trust array command may be used to perform a partial recovery of an array in which more than one drive is off-line. In this embodiment, the host and controller determines the file locations on the drives within the array, as shown in block 500. Once the file locations are determined, the host and controller determines whether any files are located on available drives only, as shown in block 504. For example, if a file was stored on drives 1–3 of a five drive array, and drives 1–3 are available, this file would be located on available drives. If any files are located on available drives only, these files are made available as read only files, as shown in block 508. Thus, in the above example, the file located on drives 1–3 of the five drive array is available as read only when drives 4 and 5 are not available, and drives 1–3 are available. If the files are not located on available drives, the files are not available as shown in block 512. Such a situation may occur, in a five drive array for example, when drives 3 and 4 are not available and the file is located on drives 1–3.

It will be understood that the partial recovery described in connection with FIG. 5 will allow a partial recovery of an array that has suffered failures of more than one disk drive. In such a case, the files which are stored solely on available drives are made available as read-only. This is a short term action which may be used to recover certain files from an array, until such a time as a rebuild of the array can take place and the data on the array is restored from a backup copy. This embodiment is especially useful in the event that a backup copy of the data may not exist. Such a situation may occur if there is a malfunction with the backup copy, if there was no backup copy made, or if a user wanted to try to recover a file which was written subsequent to the most recent backup of the array.

Figure 6:
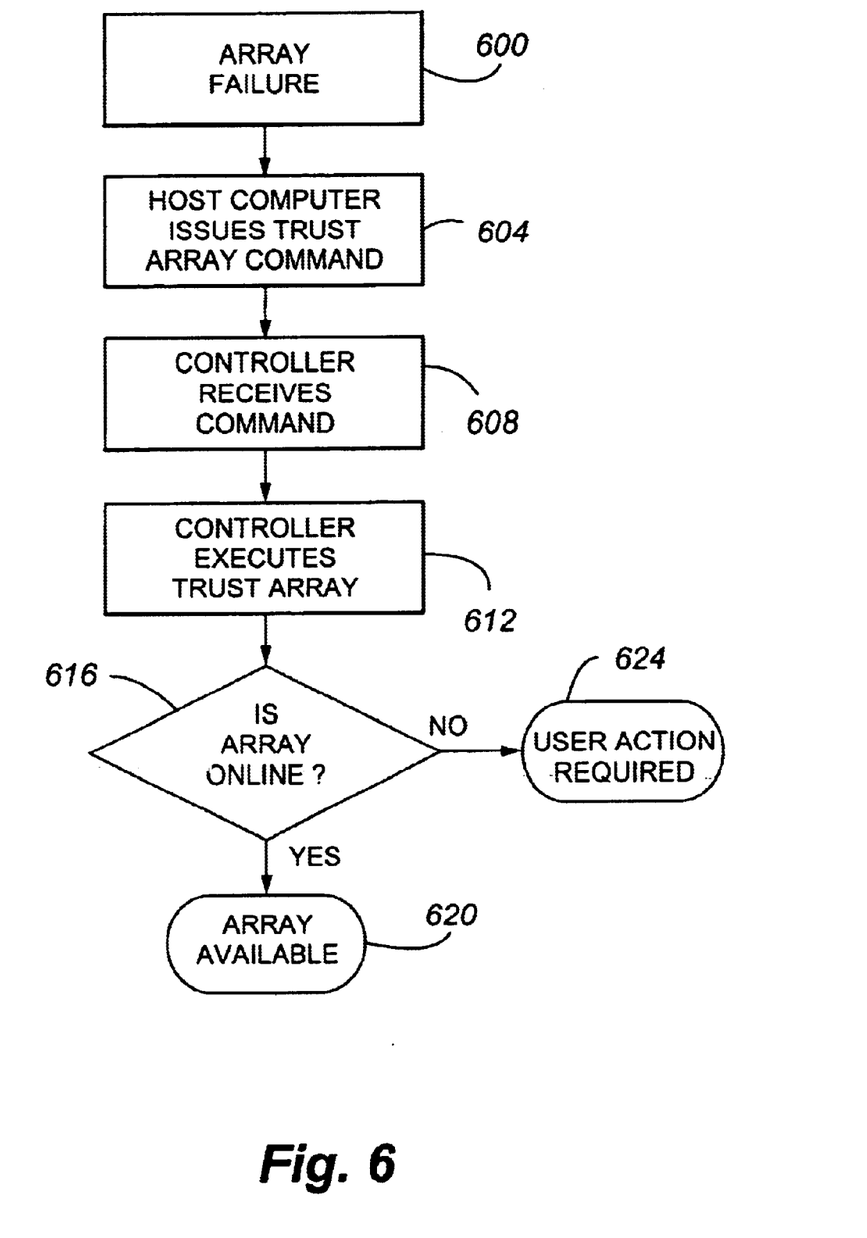
FIG. 6 is a flow chart showing the steps for automatically generating a trust array command.

In another embodiment, illustrated by the flow chart of FIG. 6, the trust array command is automatically issued by the host computer without the intervention of a user. In this embodiment, the host computer detects a failure of the RAID, shown in block 600. The host computer then issues a trust array command automatically, shown in block 604. The trust array command is then received by the controller, shown in block 608. The controller executes the trust array command, as shown in block 612. If the failure was a transient failure which did not require user intervention to correct, the RAID array will come back on-line automatically, without any user intervention. The host computer then determines whether the array is on-line, shown in block 616. If the failure does require user intervention to correct, the RAID array will remain off-line until a user takes the appropriate action to bring the RAID array back on-line, shown in block 624. If the failure did not require user intervention to correct, the array is available, shown in block 620. This embodiment is useful when the failure is a transient failure which does not require any physical correction by a user. For example, if the failure was the result of a software malfunction and restarting the system corrects the malfunction, no physical user intervention would be required. Also, if the failure was the result of a power interruption after which all drives in the system were operational, no physical user intervention would be required. This embodiment would not be able to correct a problem which does require user intervention to correct a failure. For example, if the failure was the result of a cabling problem, or an enclosure failure, the system will remain off-line until the problem is corrected. However, this embodiment may be useful to save time in correcting a failure. This is because the user will know that there is a physical problem, since the host computer would have already attempted to bring the array back on-line by using the trust array command.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best modes presently known of practicing the inventions and to enable others skilled in the art to utilize the inventions in such, or in other embodiments, and with the various modifications required by their particular application or uses of the invention. It is intended that the appended claims be construed to include alternative embodiments to the extent permitted by the prior art.

What is claimed is:

1. A method for re-using an array of storage devices, comprising:

using firstly an array of storage devices arranged in a first RAID level configuration to conduct read/write operations under control of at least a first controller including providing user data to each of said storage devices of said array;

ascertaining that a failure has occurred;

discontinuing use of at least one of said storage devices of said array related to conducting read/write operations based on the failure; and using each storage device included in said array of storage devices after said discontinuing, wherein said using said array of storage devices after said discontinuing includes accessing user data in said array of storage devices without restoring or reallocating any of said user data and without changing said first RAID level configuration to another RAID level configuration.

2. A method, as claimed in claim 1, wherein:

the failure is a temporary failure and is related to at least one of:

an array enclosure;

a back plane;

a cable;

said first controller;

an interface; and software involved with operation of said first controller.

3. A method, as claimed in claim 1, wherein:

said using said array of storage devices after said discontinuing includes making a determination after said ascertaining that a failure has occurred that each storage device in said array of storage devices can be used.

4. A method, as claimed in claim 3, wherein:

said making said determination that each storage device in said array of storage devices can be used includes checking whether one or more of said storage devices is off-line.

5. A method, as claimed in claim 1, further comprising updating metadata stored on each of said storage devices, wherein:

said updating said metadata includes modifying metadata in a primary dead partition map, wherein each of said storage devices is indicated as being valid.

6. A method, as claimed in claim 1, further comprising updating metadata stored on each of said storage devices, wherein:

said using said array of storage devices after said discontinuing includes issuing a trust array command to said first controller that causes said updating said metadata including writing all zeros in a primary dead partition map.

7. A method, as claimed in claim 6, wherein:

said using said array of storage devices after said discontinuing includes determining whether each of said storage devices of said array is accessible after said issuing of said trust array command.

8. A method, as claimed in claim 7, further comprising:

allowing said user data to be read by said first controller when more than one of said storage devices is off-line and reading said user data and/or parity from said storage devices of said array that are on-line.

9. A method, as claimed in claim 1, wherein:

said using said army of storage devices after said discontinuing includes controlling re-use of said array based on one of: a user determination and an automatic determination independently of the user.

10. A method, as claimed in claim 9, wherein:

said using said array of storage devices after said discontinuing includes generating a command by a host and transmitting said command to said first controller.

11. A method, as claimed in claim 10, wherein:

said command is initiated manually by the user of said array.

12. A method, as claimed in claim 1, further comprising:

not restoring and/or reconstructing panty information.

13. A system in which an array of storage devices are re-used after use of at least one storage device of the array is discontinued based on a fault, comprising:

an array of storage devices relative to which read and write data transfers are conducted;

a controller communicating with said array of storage devices for conducting read/write operations; and a host communicating with said controller that makes requests related to data to be stored and data to be obtained from said array of storage devices;

wherein said host is used in generating a trust array command related to updating metadata, including changing said metadata from indicating that said one or more storage devices is inaccessible to indicating that said one or more storage devices is accessible, on each of said storage devices of said array after a fault occurs and after use of said array was discontinued due to the fault, wherein said array has a first array configuration including each of said storage devices prior to said fault, wherein said array has said first array configuration including each of said storage devices after said fault, and wherein after said trust array command is generated user data stored on said storage devices is accessible in its original form and without restoration or recreation of said user data.

14. A system, as claimed in claim 13, wherein:

said trust array command is generated in response to input from a user of the system.

15. A system, as claimed in claim 13, wherein:

said trust array command is generated independently of any reconstruction and/or restoration of said array.

16. A system, as claimed in claim 13, wherein:

said host controls discontinuing use of said array of storage devices based on the fault and subsequently said host receives an input that is used in generating said trust array command.

17. A system, as claimed in claim 13, wherein:

said trust array command modifies a primary dead partition map to indicate that all of said storage devices are valid.

18. A system, as claimed in claim 13, wherein:

a determination is made by at least one of said controller and said host related to whether one or more of said storage devices is off-line before said trust array command is generated and a determination is made by at least one of said host and said controller related to whether each of said storage devices of said array is accessible after said trust array command is generated.

19. A system in which an array of storage devices are re-used after use of at least one storage device of the array is discontinued based on a fault, comprising:

an array of storage devices relative to which read and write data transfers are conducted;

a controller communicating with said array of storage devices for conducting read/write operations; and a host communicating with said controller that makes requests related to data to be stored and data to be obtained from said array of storage devices;

wherein said host is used in generating a trust array command related to updating metadata on each of said storage devices of said array after a fault occurs and after use of said array was discontinued due to the fault, said trust array command being generated in response to input from a user of the system.

20. A method for controlling an array of storage devices, comprising:

provding an array of storage devices;

first storing data on said array of storage devices in accordance with a first RAID level;

detecting a fault with respect to at least one of said storage devices;

after said detecting a fault, receiving a trust array command; and in response to said trust array command, at least one of storing data on and reading data from each storage device included in said array of storage devices, wherein said at least one of storing data on and reading data from each storage device is performed without restoring any of said data stored on said array of storage devices during said first storing data.

21. The method of claim 20, wherein said detecting a fault comprises detecting a fault with respect to more than one of said storage devices.

22. The method of claim 20, wherein said at least one of storing data on and reading data from each storage device in response to said trust array command comprises storing data on said array of storage devices in accordance with said first RAID level.

23. The method of claim 20, wherein none of said storage devices included in said array of storage devices is replaced prior to said receiving a trust array command.

* * * * *